United States Patent Office 3,642,782
Patented Feb. 15, 1972

3,642,782
SCHIFF BASES OF PYRIDOXAL
Yasuo Fujimoto, Tokyo-to, Japan, assignor to Kyowa Hakko Kogyo Kabushiki Kaisha, Tokyo-to, Japan
No Drawing. Filed Apr. 29, 1969, Ser. No. 820,282
Claims priority, application Japan, May 2, 1968, 43/29,121; May 25, 1968, 43/35,045; May 29, 1968, 43/35,991; June 1, 1968, 43/37,074; June 3, 1968, 43/37,541; June 4, 1968, 43/37,770
Int. Cl. C07d 49/06
U.S. Cl. 260—240 G        11 Claims

ABSTRACT OF THE DISCLOSURE

Schiff bases prepared from pyridoxal and process for their preparation.

BACKGROUND OF THE INVENTION AND DESCRIPTION OF THE PRIOR ART

It is known to prepare Schiff bases of pyridoxal by condensing aniline, benzylamine, phenylethylamine, isobutylamine, aminophenol, anisidine, toluidine or chloraniline with pyridoxal [J. Am. Chem. Soc., 70, 3669 (1948); 76, 5589 (1954); Japanese patent publication No. 26,820/65]. Certain amines conventionally used for preparing Schiff bases of pyridoxal have, however, disadavntages including strong toxicity, instability under storage (e.g., oxidation), poor solubility and poor crystallinity of the obtained Schiff base.

DESCRIPTION OF THE INVENTION

For the purpose of overcoming these disadvantages and providing Schiff bases of pyridoxal, Schiff bases of the following formula as well as processes for their preparation are provided:

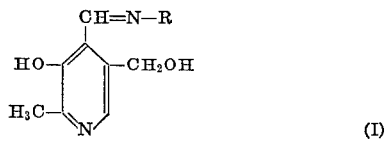
(I)

According to the first aspect of the invention, a Schiff base of pyridoxal of Formula I is provided wherein R is

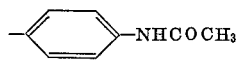

This Schiff base (i.e., p-pyridoxylideneaminoacetanilide) is less toxic and can be handled easier than conventional pyridoxal Schiff bases and is an intermediate for the preparation of various pyridoxals. It is prepared by reacting pyridoxal with p-aminoacetanilide.

According to the second aspect of the invention, Schiff bases of pyridoxal of Formula I are provided wherein R is

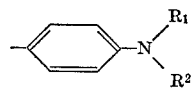

and wherein $R^1$ and $R^2$ are each alkyl. These Schiff bases (i.e., p-pyridoxylideneamino-N,N-dialkylanilines) are prepared by reacting pyridoxal with a p-amino-N,N-dialkylaniline. Exemplary alkyl groups include lower alkyl groups such as methyl, ethyl, propyl, butyl, pentyl, hexyl and isomers thereof. Exemplary p-amino-N,N-dialkylanilines include p-amino-N,N-dimethylaniline, p-amino-N,N-diethylaniline, p-amino-N,N-dipropylaniline, p-amino-N,N-dibutylaniline, p-amino-N,N-dipentylaniline, p-amino-N,N-dihexylaniline and p-amino-N-methyl - N - ethylaniline. These aniline derivatives are less toxic and less prone to oxidation under storage than conventionally used amines and, accordingly, are safer to handle.

According to the third aspect of the invention, Schiff bases of Formula I are provided wherein R is

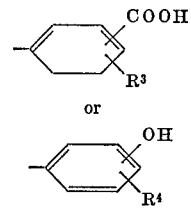

and wherein $R^3$ is halogen, hydrogen, hydroxy, nitro, lower alkyl or lower alkoxy and $R^4$ is halogen, nitro, lower alkyl or lower alkoxy. These Schiff bases are prepared by reacting pyridoxal with an amine of the formula

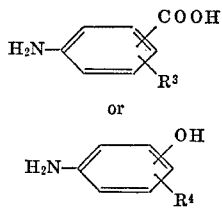

wherein $R^3$ and $R^4$ are as defined above. Exemplary amines according to this aspect of the invention include o-, m- and p-amino-benzoic acids and their derivatives. Suitable substituents (represented by $R^3$ above) include hydroxy, chloro, bromo, nitro, methyl, ethyl, propyl, butyl, pentyl, methoxy, ethoxy, butoxy and propoxy groups. Exemplary amines according to this aspect of the invention also include substituted o-, m- and p-amino-phenols.
Suitable substituents (represented by $R^4$ above) include chloro, bromo, nitro, methyl, ethyl, propyl, butyl, pentyl, methoxy, ethoxy, propoxy and butoxy groups. Preferred reactants according to this aspect of the invention are derivatives of p-aminobenzoic acid and o-aminophenol. Aminophenols substituted as described above give much improved yields over unsubstituted aminophenols.

According to the fourth aspect of the invention, a Schiff base of Formula I is provided wherein R is

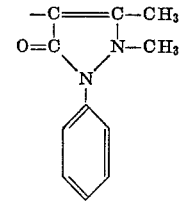

This Schiff base (i.e., 4-pyridoxylideneaminoantipyrine) is prepared by reacting pyridoxal with 4-aminoantipyrine.

According to the fifth aspect of the invention. Schiff bases of Formula I are provided wherein R is

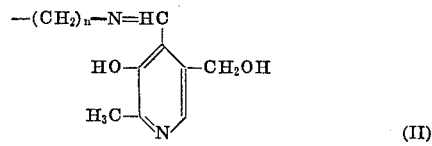
(II)

or $$-(CH_2)_n-NH_2-$$  (III)

and wherein $n$ is the integer 5, 6, 7 or 8. These Schiff bases are prepared by reacting pyridoxal with a polymethylene diamine (i.e., pentamethylene-, hexamethylene-, heptamethylene- and octamethylene diamine) of the formula

wherein n is defined as above. Whether a Schiff base of Formula II or III is produced depends upon the mole ratio of amine reactant to pyridoxal. For example, when one mole of pyridoxal is reacted with less than one-half mole of polymethylene diamine, a Schiff base of Formula II is produced whereas a Schiff base of Formula III is produced when an excess of polymethylene diamine is employed.

According to the sixth aspect of the invention, Schiff bases of Formula I are provided wherein R is

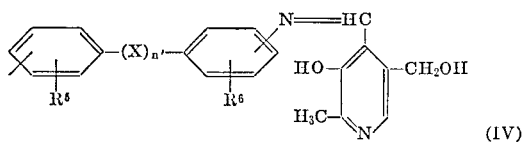

or

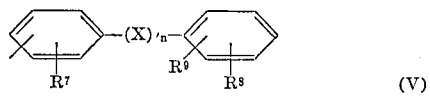

and wherein $R^5$, $R^6$, $R^7$ and $R^8$ are each hydrogen, lower alkyl or lower alkoxy, $R^9$ is hydrogen or amino, $n'$ is the integer 0, 1 or 2 and X is —N=N—, —NH— or —CH$_2$—. These Schiff bases are prepared by reacting pyridoxal with an amine of the formula

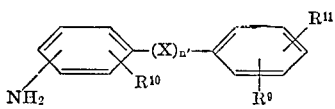

wherein $R^9$, $n'$ and X are defined as above, $R^{10}$ corresponds to $R^5$ or $R^7$ above and $R^{11}$ corresponds to $R^6$ or $R^8$ above. When $R^9$ is amino, a Schiff base of either Formula IV or V above may be produced depending on the mole ratio of amine reactant to pyridoxal. For example, when one mole of pyridoxal is reacted with less than one-half mole of amine reactant wherein $R^9$ is amino, a Schiff base of Formula IV is produced whereas a Schiff base of Formula V is produced when an excess of amine reactant wherein $R^9$ is amino is employed.

According to the present invention, the amine reactant is employed in its acid salt form or in its free form dissolved in water or an organic solvent. Pyridoxal is dissolved in either aqueous or organic solvent and the amine reactant is added to the pyridoxal solution. High purity pyridoxal is not required for the purposes of the present invention. It is possible to use an oxidized solution of pyridoxine or any fermentation broth containing pyridoxal which may be obtained by culturing a suitable microorganism. The pH of the combined solution of pyridoxal and amine reactant is adjusted, if necessary, to slightly acidic to slightly alkaline pH (preferably 3–8 according to the first, second and fifth aspects of the invention; preferably 2–8 according to the third aspect of the invention; preferably 4–8 according to the fourth and sixth aspects of the invention) and reaction is carried out at ambient or higher or lower temperature for a suitable period of time (preferably 0.5 to 2.0 hours) to obtain precipitates of Schiff base. The precipitates are then separated by filtration and washed with water or a suitable organic solvent. The precipitates of Schiff base are highly pure and may be used as starting materials in any desired subsequent reaction without pretreatment or purification. The Schiff bases obtained according to this invention may be hydrolyzed by conventional acid or alkali hydrolysis to yield pyridoxal in pure form which can be easily separated from the reaction mixture.

SPECIFIC EMBODIMENTS

The following non-limitative examples illustrate the invention:

Example 1

Forty-five (45) g. of manganese dioxide were added to 100 ml. of a 15% (by volume) nitric acid solution which was then stirred for one hour at room temperature. Precipitates formed and were separated by filtration and then washed with water until the pH of the washings reached 5. The precipitates which consisted of nitric acid treated manganese dioxide were dried by heating at 220 to 250° C. for up to 10 hours. 4.1 g. of pyridoxine hydrochloride were dissolved in 40 ml. of 5% sulfuric acid solution (or optionally in 50 ml. of 1 N hydrochloric acid solution) and the solution was combined with 2.1 g. of the aforementioned nitric acid treated manganese dioxide. The mixture was stirred for 4 hours at room temperature to give an acidic, aqueous solution of pyridoxal. The pH of the solution was adjusted to about 5 by adding sodium acetate.

Three (3) g. of p-aminoacetanilide were dissolved in 20 ml. of dilute 2 N hydrochloric acid solution and combined with all of the aforementioned pyridoxal solution. The mixture was stirred for 30 minutes at room temperature and the pH was adjusted to 3 by adding sodium acetate. Reddish brown precipitates formed which were separated by filtration and washed with water to yield 1.55 g. of p-pyridoxylideneaminoacetanilide. The product was identified as p-pyridoxylideneaminoacetanilide by means of elementary analysis and quantitative determination of pyridoxal and p-aminoacetanilide after hydrolysis with alkali.

Example 2

Three (3) g. of p-aminoacetanilide were dissolved in 100 ml. of 1,2-dichloroethane and combined with all of an aqueous solution of pyridoxal prepared as in Example 1. The mixture was stirred for one hour at room temperature to give reddish brown precipitates. The precipitates were separated by filtration, washed with water and alcohol and then dried to yield 1.6 g. of p-pyridoxylideneaminoacetanilide.

Example 3

Eight (8) g. of p-aminoacetanilide were dissolved in 100 ml. of alcohol and combined with a filtrate of a fermentation liquor containing 3.4 g. of pyridoxal. The mixture was stirred for 30 minutes at room temperature to give precipitates which were recovered to yield 1.45 g. of p-pyridoxylideneaminoacetanilide.

Example 4

2.3 g. of p-amino-N,N-dimethylaniline were dissolved in 100 ml. of alcohol and combined with all of an aqueous solution of pyridoxal prepared as in Example 1. Stirring for one hour at room temperature gave yellowish brown precipitates. The precipitates were separated by filtration and washed with a mixture of water and alcohol to yield 4.3 g. of p-pyridoxylideneamino-N,N-dimethylaniline. The product, which was recrystallized from alcohol had a melting point of 225° C. (decomposed). The product was identified as p-pyridoxylideneamino-N,N-dimethylaniline by means of elementary analysis and quantitative determination of pyridoxal and p-amino-N,N-dimethylaniline after hydrolysis.

Example 5

3.4 g. of p-amino-N,N-diethylaniline were dissolved in 100 ml. of 1,2-dichloroethane and combined with all of an aqueous solution of pyridoxal prepared as in Example 1. Precipitates formed after stirring for one hour at room temperature. The precipitates were separated by filtration and washed with water and alcohol to yield 4.5 g. of p-pyridoxylideneamino-N,N-diethylaniline.

Example 6

2.3 g. of p-amino-N,N-dibutylaniline were dissolved in 100 ml. of alcohol and combined with stirring with 150 ml. of a filtrate of a fermentation liquor containing 1.7 g. of pyridoxal. The pH of the mixture was adjusted to 5 by adding sodium acetate and the mixture was then stirred for 2 hours at room temperature. Precipitates formed which were separated by filtration and washed with water and alcohol to yield 2.4 g. of p-pyridoxylideneamino-N,N-dibutylaniline.

Example 7

2.8 g. of p-aminobenzoic acid were dissolved in 100 ml. of 1,2-dichloroethane and combined with all of an aqueous solution of pyridoxal prepared as in Example 1. Stirring for one hour at room temperature gave yellowish orange precipitates. The precipitates were separated by filtration and washed with water and methanol. After drying, 4.2 g. of p-pyridoxilidene aminobenzoic acid were obtained. The product was identified as p-pyridoxylideneaminobenzoic acid by means of elementary analysis and quantitative determination of pyridoxal and p-aminobenzoic acid after alkaline hydrolysis.

Example 8

3.2 g. of 4-amino-3-hydroxybenzoic acid were dissolved in 100 ml. of 1,2-dichloroethane and combined with all of an aqueous solution of pyridoxal prepared as in Example 1. Stirring for 30 minutes at room temperature gave light yellow colored precipitates which were separated by filtration to yield 4.2 g. of 4-pyridoxylideneamino-3-hydroxy benzoic acid.

Example 9

1.3 g. of 2-amino-4-methyl-phenol were dissolved in 100 ml. of ethanol and combined with 200 ml. of a fermentation broth containing 1.7 g. of pyridoxal. The pH of the solution was adjusted to 4 by adding sodium acetate and the solution was then stirred for one hour at room temperature to give reddish orange colored precipitates. The precipitates were separated by filtration to yield 2.0 g. of 2-pyridoxylideneamino-4-methylphenol. The melting point of the product recrystallized from dioxane was 222.5° C.

Example 10

1.6 g. of 2-amino-4-chlorophenol were treated in a manner similar to that described in Example 9 to yield 2.2 g. of orange colored 2-pyridoxylideneamino-4-chlorophenol.

Example 11

2.0 g. of 3-amino-5-nitrobenzoic acid were treated in a manner similar to that described in Example 9 to yield 1.9 g. of 3-pyridoxylideneamino-5-nitrobenzoic acid.

Example 12

Four (4) g. of 4-aminoantipyrine were dissolved in 150 ml. of water and then combined with all of an aqueous solution of pyridoxal prepared as in Example 1. Stirring for 30 minutes at room temperature gave yellowish precipitates which were separated by filtration. The precipitates were washed with water and dried to give 5.4 g. of 4-pyridoxylideneaminoantipyrine which had a melting point of 271° C. (decomposed) when recrystallized from a mixture of 1,2-dichloroethane and ethanol. The product was identified as 4-pyridoxylideneaminoantipyrine by means of elementary analysis and quantitative determination of pyridoxal and amine produced after hydrolysis with alkali.

Example 13

Four (4) g. of 4-aminoantipyrine were dissolved in 150 ml. of methyl alcohol and combined with all of an aqueous solution of pyridoxal prepared as in Example 1. The mixture was heated in a water bath and stirred at 40° C. for 60 minutes to give yellowish precipitates which were separated by filtration to yield 5.7 g. of 4-pyridoxylideneaminoantipyrine.

Example 14

Two (2) g. of 4-aminoantipyrine were dissolved in 100 ml. of water and combined with 250 ml. of filtrate of a fermentation liquor containing 1.7 g. of pyridoxal. The pH of the mixture was adjusted to 4.5 by adding sodium acetate and the mixture was left standing for one hour to give yellowish precipitates. The precipitates were separated by filtration and washed with water. After drying 2.7 g. of 4-pyridoxylideneaminoantipyrine were obtained.

Example 15

One (1) g. of hexamethylene diamine was dissolved in 100 ml. of water and combined with all of an aqueous pyridoxal solution prepared as in Example 1. The mixture was stirred at room temperature for one hour. Yellowish brown precipitates formed which were washed with water and dried to yield 2.3 g. of N,N'-dipyridoxylidene hexamethylene diamine. Elementary analysis and quantitative determination of amine and pyridoxal after alkaline hydrolysis confirmed that the product was composed of one molecule of the amine and two molecules of pyridoxal.

Example 16

Five (5) g. of hexamethylene diamine were dissolved in 200 ml. of water and added dropwise to all of an aqueous solution of pyridoxal prepared as in Example 1. The mixture was stirred for 30 minutes at room temperature. Brown precipitates formed which were filtered to yield 1.6 g. (dry weight) of N-pyridoxylidene hexamethylene diamine.

Elementary analysis and quantitative determination of pyridoxal after alkaline hydrolysis confirmed that the product was composed of one molecule of amine and one molecule of pyridoxal.

Example 17

1.1 g. of octamethylene diamine were dissolved in 200 ml. of alcohol and combined with all of an aqueous solution of pyridoxal prepared as in Example 1. The mixture was heated to 25 to 30° C. and stirred for 30 minutes at room temperature. Brown precipitates formed which were filtered and dried to give 2.2 g. of N,N'-dipyridoxylidene octamethylene diamine.

Example 18

0.9 g. of pentamethylene diamine were dissolved in 100 ml. of water and gradually added to 200 ml. of the filtrate of a fermentation liquor containing 3.4 grams of pyridoxal. The mixture was adjusted to 5 by adding sodium acetate and the mixture was stirred for one hour at room temperature to give precipitates which were then separated by filtration and dried to give 2.3 g. of N,N'-dipyridoxylidene pentamethylene diamine.

Example 19

Two (2) g. of 4,4'-diaminodiphenylamine were dissolved in 100 ml. of 1,2-dichloroethane. The mixture was combined with all of an aqueous solution of pyridoxal prepared as in Example 1 and the combined mixture stirred for 30 minutes at room temperature. Black precipitates formed which were separated by filtration to give 3.4 grams of 4,4'-di(pyridoxylideneamino)diphenylamine. Elementary analysis and quantitative determination confirmed that one molecule of amine was condensed with two molecules of pyridoxal. The determination was performed by hydrolyzing the product with alkali.

Example 20

Two (2) grams of p,p'-diaminodiphenylmethane were dissolved in 100 ml. of ethyl ether and combined with all of an aqueous solution of pyridoxal prepared as in Example 1. The mixture was stirred for one hour at room temperature. Yellowish orange precipitates formed which were separated by filtration to give 2.3 g. of p,p'-di(pyridoxylideneamino)diphenylmethane. The product was recrystallized by using a mixture of ethylene dichloride and methanol. Melting point: 255–257° C. Elementary analysis and quantitative determination carried out after alkaline hydrolysis confirmed that two molecules of pyridoxal were condensed with one molecule of p,p'-diaminodiphenylmethane.

Example 21

Two (2) grams of o-dianisidine were dissolved in 50 ml. of 1,2-dichloroethane and treated in a manner similar to that described in Example 20. Yellowish brown precipitates of N,N'-dipyridoxylidene-o-dianisidine formed which were washed with water, methanol and 1,2-dichloroethane. After drying 2.6 g. of the final product were obtained. Melting point: 220–221° C.

Example 22

Eight (8) g. of p-aminoazobenzene were dissolved in 50 ml. of 1,2-dichloroethane and combined with all of an aqueous solution of pyridoxal prepared as in Example 1. The mixture was stirred for 30 minutes at room temperature. Orange crystals formed which were separated by filtration to yield 4.7 g. of p-pyridoxylideneaminoazobenzene.

Example 23

1.8 g. of benzidine were dissolved in 50 ml. of methanol and combined with 200 ml. of the filtrate of a fermentation liquor containing 1.7 g. of pyridoxal. After adjusting the pH to 6 by using sodium acetate, the mixture was stirred for one hour at room temperature. Precipitates formed which were separated by filtration and washed with water. After drying, 2.4 g. of N,N'-dipyridoxylidenebenzidine were obtained having a melting point of 115 to 120° C.

Example 24

8.0 g. of p,p'-diaminodiphenylmethane were dissolved in 400 ml. of ethyl ether and added dropwise to 500 ml. of the filtrate of a fermentation liquor containing 1.7 g. of pyridoxal. The mixture was stirred and sodium acetate was added to adjust the pH to 6. After stirring for one hour, precipitates formed which were separated by filtration and successively washed with water and with a mixture of methanol and ethyl ether and then recrystallized by using a mixture of 1,2-dichloroethane and methanol to yield 8.5 g. of p-pyridoxylideneamino-p'-aminodiphenylmethane. Elementary analysis and quantitative determination after alkaline hydrolysis confirmed that the product was a Schiff base composed of one molecule of amine and one molecule of pyridoxal.

I claim:

1. A compound of the formula

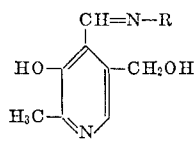

wherein R is (a) 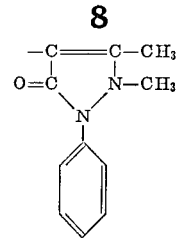

(b) 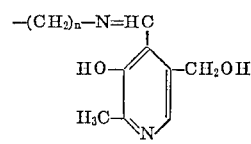

(c) 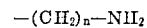

(d) 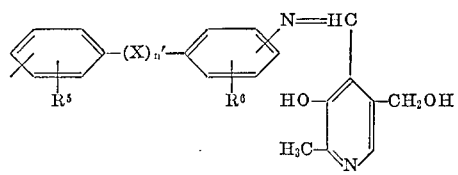

(e) 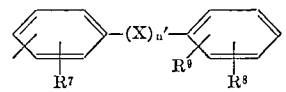

(f) 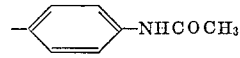

(g) $-(CH_2)_n-NH_2$ (h) 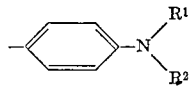

or (i) 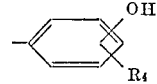

and $R^1$ and $R^2$ are each lower alkyl; $R^3$ is halogen, hydrogen, nitro, lower alkyl or lower alkoxy; $R^4$ is halogen, nitro, lower alkyl or lower alkoxy; $R^5$, $R^6$, $R^7$ and $R^8$ are each hydrogen, lower alkyl or lower alkoxy; $R^9$ is hydrogen or amino; $n$ is the integer 5, 6, 7 or 8; $n'$ is the integer 0 or 1 and X is $-N=N-$, $-NH-$ or $-CH_2-$, except that when $R^9$ is H, $R^7$ and $R^8$ cannot be methyl.

2. The compound of claim 1 wherein R is $-\langle\phantom{O}\rangle-NHCOCH_3$

3. The compound of claim 1 wherein R is

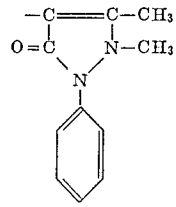

and $R^1$ and $R^2$ are each lower alkyl.

4. The compound of claim 3 wherein $R^1$ and $R^2$ are each methyl, ethyl, propyl, butyl, pentyl or hexyl.

5. The compound of claim 1 wherein R is

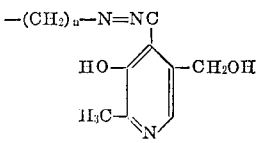

and $R^4$ is halogen, nitro, lower alkyl or lower alkoxy.

6. The compound of claim 5 wherein $R^4$ is chloro, bromo, nitro, methyl, ethyl, propyl, butyl, pentyl, methoxy, ethoxy, propoxy or butoxy.

7. The compound of claim 1 wherein R is

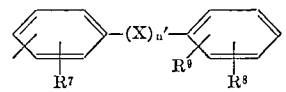

8. The compound of claim 1 wherein R is

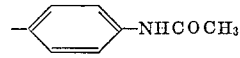

and $n$ is the integer 5, 6, 7 or 8.

9. The compound of claim 1 wherein R is

—(CH$_2$)$_n$—NH$_2$ and n is the integer 5, 6, 7 or 8.

10. The compound of claim 1 wherein R is

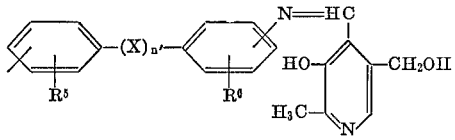

and R$^5$ and R$^6$ are each hydrogen, lower alkyl or lower alkoxy, n' is the integer 0 or 1 and X is —N=N—, —NH— or —CH$_2$—.

11. The compound of claim 1 wherein R is

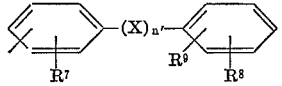

and n' is the integer 0 or 1, R$^7$ and R$^8$ are each hydrogen, lower alkyl or lower alkoxy, R$^9$ is hydrogen or amino and X is —N=N—, —NH— or —CH$_2$—, except that when R$^9$ is H, R$^7$ and R$^8$ cannot be methyl.

References Cited

UNITED STATES PATENTS 2,614,104  10/1952  Winsten _____ __260—240

OTHER REFERENCES

Braunstein et al., Chem. Abst. 50: 8761c.
Pogell, Chem Abst. 52: 16451d.

HENRY R. JILES, Primary Examiner

G. T. TODD, Assistant Examiner

U.S. Cl. X.R.

260—240 A, 296 V, 240.9